Nov. 24, 1925.
P. CARLSON
WINDSHIELD
Filed Nov. 9, 1923
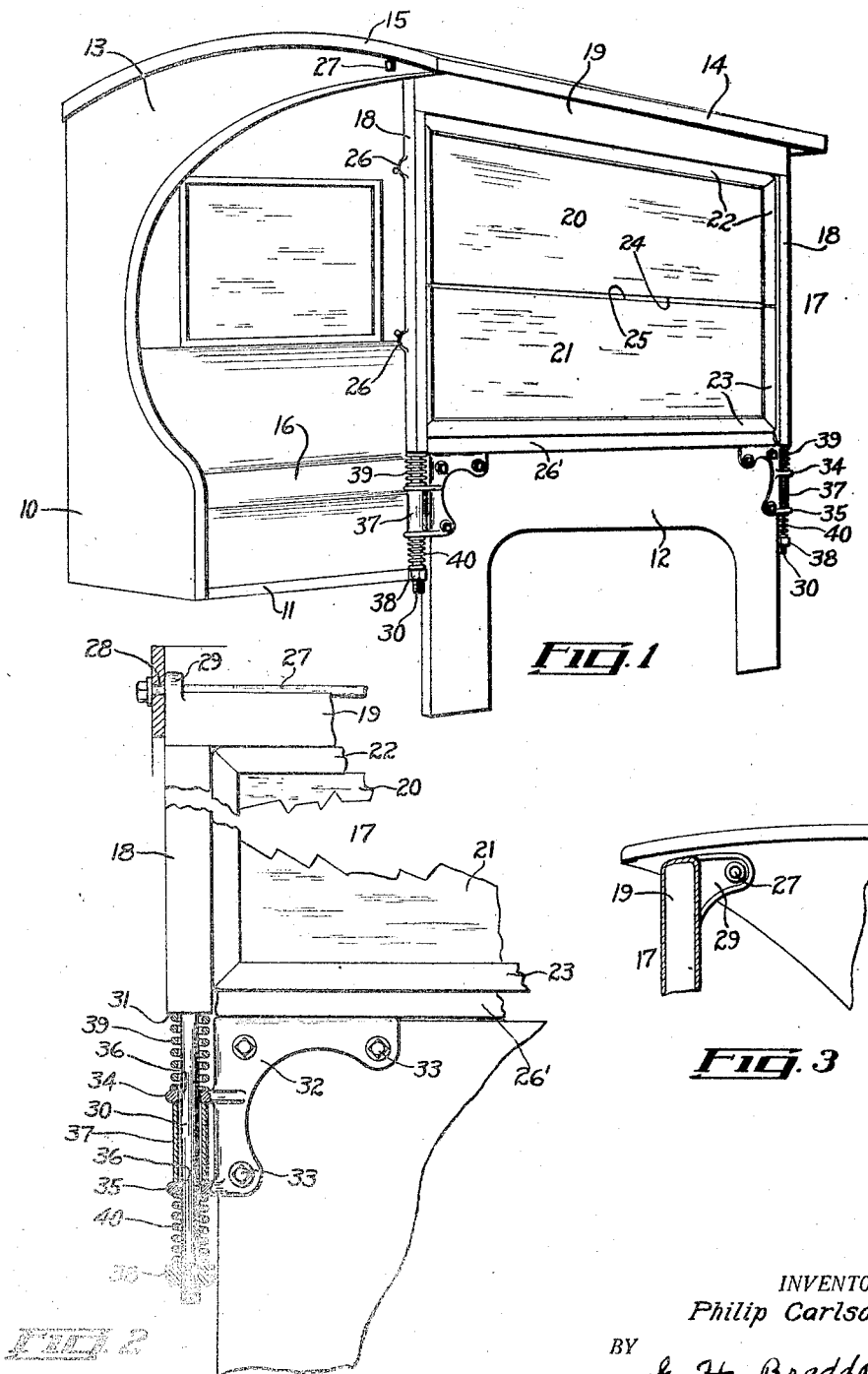
INVENTOR.
Philip Carlson
BY G. H. Braddock
ATTORNEY.

Patented Nov. 24, 1925.

1,563,159

UNITED STATES PATENT OFFICE.

PHILIP CARLSON, OF BRIDGEPORT, CONNECTICUT, ASSIGNOR TO METROPOLITAN BODY COMPANY, OF BRIDGEPORT, CONNECTICUT, A CORPORATION OF CONNECTICUT.

WINDSHIELD.

Application filed November 9, 1923. Serial No. 673,689.

*To all whom it may concern:*

Be it known that PHILIP CARLSON, a citizen of the United States, and resident of Bridgeport, in the county of Fairfield and State of Connecticut, has invented certain new and useful Improvements in Windshields, of which the following is a specification.

This invention relates to a wind shield, and the broad object of the invention is to provide a novel wind shield, more particularly adapted for use in connection with cabs of automotive trucks or vehicles, equipped with improved shock absorbing devices.

A more specific object is to provide an improved wind shield adapted to fill in customary manner the vision space between the forward portion of the top of a truck or vehicle, such as the roof of a truck cab, and a dash board or the like fixed upon the truck chassis, and to equip the wind shield with resilient supports capable of cushioning and absorbing up and down shocks and stresses, permitting the truck chassis to twist and weave without affecting the cab or wind shield.

A further specific object is to provide a wind shield as stated having its upper part pivotally secured to the forward portion of a truck top or cab roof, and having its lower part resiliently secured to a dash board or the like in such manner that the wind shield can have slight forward and rearward swinging movement upon its pivot, the attachment between said windshield and truck top or cab roof including a bolt or other means capable of acting as a pivot support between said shield and roof, and the attachment between said dash board and wind shield including upper springs for the absorption of shocks tending to move said truck top or cab roof and said dash board toward each other, and lower springs acting as rebound members for the absorption of shocks or reactions tending to move said top or roof and said dash board apart, all as will be fully set forth.

With the above objects in view, as well as others which will become apparent as the specification proceeds, the invention comprises the construction, arrangement and combination of parts as now to be fully described and as hereinafter to be specifically claimed, it being understood that the disclosure herein is merely illustrative of the principles of the invention and meant in no way in a limiting sense, changes in details of construction and arrangement of parts being permissible so long as within the scope of the appended claims.

In the accompanying drawing forming a part of this specification,

Fig. 1 is a perspective view of so much of a cab truck as is necessary to disclose the novel wind shield Fig. 2 is a fragmentary perspective view, on an enlarged scale and partially in section, disclosing in detail the pivotal connection between the forward portion of the cab roof and the upper part of the wind shield, and the resilient connection between the lower part of the wind shield and the dash board of the truck; and Fig. 3 is a further detail of said pivotal connection.

With respect to the drawing and the numerals of reference indicated thereon, 10 denotes a truck cab having a base 11 adapted to be rigidly secured to a truck chassis (not shown), and 12 represents a dash board also adapted to be rigidly secured to said chassis. The upper part 13 of the cab extends forwardly, and the front edge 14 of its top or roof 15 terminates adjacent the vertical plane of the dash board 12, preferably a trifle in advance of said dash board, as shown. The construction and arrangement thus far described is in a general way common to all automotive trucks or vehicles having cabs and forms no part of the present invention.

As is well known, it is highly advantageous, if not essential, to fill in the space between the cab roof 15 and dash board 12, this being the vision space of the truck or vehicle, directly in front of the driver, who occupies the seat 16, more clearly disclosed in Fig. 1. Naturally, by far the greater portion of this vision space should consist of glass or some other suitable vision element, always fragile.

Heretofore, it has usually been the practice to build in solidly between the cab roof and dash board, but in use the forward portion of a roof of a cab (ordinarily of steel) and a dash board (constructed and arranged in the manner shown and briefly described) are prone to have jerking movements toward and away from each other, vertically or approximately vertically, shifting forwardly and rearwardly, by reason of shocks imparted to the truck chassis, as will be understood, with the result that the fittings and glass of a solidly built-in wind shield are often stressed to the breaking point of the fittings and the shattering point of the glass. It was with the view of overcoming strain upon fittings and glass thus utilized as a wind shield, as well as strain upon the cab roof, particularly the forward portion thereof, that the present invention was designed, although it will be clear that the principles of the invention are applicable to automotive trucks or vehicles other than those having cabs, so-called. That is to say, the improved wind shield can be applied to any truck or vehicle, to fill the space between an upper and a lower member, wherein there is liability of relative movement between said members tending to misshape or break the fittings of said wind shield or to shatter the glass thereof.

Numeral 17 denotes, generally, the novel wind shield. As disclosed, it consists of a frame including steel side posts or uprights 18 between the upper ends of which a cross piece 19 extends, and an upper and a lower wind shield glass, denoted 20 and 21, respectively. Each glass 20 and 21 has a frame, denoted 22 and 23, respectively, extending about three of its edges, the lower edge 24 of the upper glass and the upper edge 25 of the lower glass being not framed. As shown more clearly in Fig. 1, the side members of the frames 22 and 23, respectively, are pivotally mounted in the uprights 18, as denoted generally at 26, in such manner that the wind shield glasses can be adjusted to closed or to any desired open position. When these glasses are in closed position, the upper edge of the top frame member 22 is preferably contiguous with the cross piece 19, and the adjacent, unframed edges 24 and 25 are closely adjacent each other. Either or both of said edges could be provided with rubber cushions. Numeral 26' represents a strip of gum rubber carried by the lower panel of the wind shield glass frame 23, for a purpose to be explained. It will be apparent that a single glass could be substituted for the glasses 20 and 21.

Referring more particularly to Figs. 2 and 3, 27 denotes a bolt extending transversely of the cab and situated in the side walls thereof, as denoted at 28, preferably just below the cab roof, and 29 represents perforated ears upon the cross piece 19, arranged between and desirably contiguous with said side walls, freely receiving said bolt. Obviously, the bolt serves as a pivotal support for the wind shield designed to allow said shield to have forward and rearward swinging movement.

As shown more clearly in Figs. 1 and 2, the bolt 27 is desirably situated so that the wind shield will be disposed in vertical plane of the dash board 12, and the side posts or uprights 18 have reduced, preferably cylindrical extensions 30 designed to lie adjacent the opposite side edges of said dash board. About the upper end of each extension 30 is a shoulder 31 constituting the lower end of the larger part of a side post or upright 18.

Numeral 32 represents brackets, one at each side edge of the dash board desirably at or near the upper edge thereof, mounted on the dash board as denoted at 33. As disclosed very clearly in Fig. 2, each bracket has spaced apart, outwardly extending, vertically aligning upper and lower bosses, denoted 34 and 35, respectively, situated adjacent an edge of the dash board in alignment therewith, and each boss is provided with an opening 36 to freely or loosely receive a reduced extension 30 of a post or upright 18. 37 is a tubular member arranged between the bosses of each bracket and also freely or loosely receiving said extension 30.

Each boss 34 is normally spaced at some little distance from the shoulder 31 of the side post or upright the extension of which said boss receives, below said shoulder, and each boss 35 is desirably spaced an equal distance from a nut 38 on the lower, threaded end portion of said extension, above said nut.

Numeral 39 represents an upper coil spring on each extension 30 and having its ends engaging the boss 34 and shoulder 31, and 40 represents a lower coil spring upon each extension and having its ends engaging the boss 35 and nut 38, all of said coil springs preferably being duplicates and being of predetermined weight and strength to best perform their service.

The manner in which the improved wind shield will function is obvious. When a truck's wheels hit uneven surfaces or obstructions so that the truck chassis bounces, twists and weaves to tend to impart to the cab roof a whipping, forwardly and rearwardly swaying motion, as well as to tend to impart to the forward portion of the cab roof and dash board jolting movements toward and from each other, the upper springs or cushions 39 will act to absorb motions or shocks tending to move the cab roof and dash board toward each other, while the lower springs or cushions 40 will act as rebound members to absorb motions, reactions or shocks tending to move said roof and dash board apart, the pivotal connection between the upper part of the wind shield and the cab roof, supplemented by the free or loose fit of the extensions 30 of the side posts or uprights 18 in the bosses of the brackets 32, serving to care for the whipping swaying movements of the cab roof, to thus eliminate stresses upon the fittings and glass of the wind shield, as well as upon the cab.

The upper portion of the wind shield is preferably contiguous with or closely adjacent to the cab roof, while the lower edge of the frame of the wind shield glass 21 when in closed position is spaced at some little distance from the upper edge of the dash board, the gum rubber 26' serving as an elastic filler between said frame and dash board.

Having thus fully described the invention, what I claim as new and desire to secure by Letters Patent is:

1. In a vehicle, an upper member, a lower member, there being a vision space between the members, and a wind shield in said vision space and extending between said members, the wind shield being pivotally connected to one of said members and resiliently connected to the other member, said resilient connection including means for absorbing shocks tending to move said members toward and away from each other.

2. In a vehicle, an upper member, a lower member, there being a vision space between the members, and a wind shield in said vision space and extending between said members, the wind shield being pivotally connected to one of said members and resiliently connected to the other member, said resilient connection including a cushion for absorbing shocks tending to move said members toward each other, and a cushion for absorbing shocks tending to move said members away from each other.

3. The combination as specified in claim 1, wherein the wind shield includes side posts which are resiliently connected to said other member, the resilient connection of the side posts being adapted to allow the wind shield to have slight swinging movement upon its pivot.

4. In a vehicle, an upper member, a wind shield pivoted thereto and having downwardly disposed side posts provided with extensions, a stop member upon the lower end portion of each extension, a lower member having means freely and slidably receiving said extensions, a coil spring upon each extension above said means and engaging said means and post, and a second coil spring upon each extension below said means and engaging said means and stop member.

5. In a vehicle, a cab with forwardly projecting roof, a wind shield pivoted to said roof and having downwardly disposed side posts provided with extensions, a dash board, said cab and dash board adapted to be rigidly secured to the chassis of said vehicle and said wind shield adapted to fill the space between said roof and dash board, brackets mounted upon said dash board and having bosses freely and slidably receiving said extensions, there being a stop member at the lower end portion of each extension, a coil spring on each extension engaging a boss and a side post, and a second coil spring upon each extension engaging a boss and a stop member.

6. The combination as specified in claim 5, wherein the body of the wind shield has a rubber strip upon its lower edge adapted to lie contiguous with the dash board to serve as an elastic filler between said body and dash board.

Signed at Bridgeport, in the county of Fairfield, and State of Connecticut, this 7th day of September, A. D. 1923.

PHILIP CARLSON.